US011454718B2

(12) United States Patent
Westerhoff

(10) Patent No.: US 11,454,718 B2
(45) Date of Patent: Sep. 27, 2022

(54) VERTICAL ROAD PROFILE ESTIMATION

(71) Applicant: APTIV TECHNOLOGIES LIMITED, St. Michael (BB)

(72) Inventor: Jens Westerhoff, Bochum (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 111 days.

(21) Appl. No.: 15/930,725

(22) Filed: May 13, 2020

(65) Prior Publication Data

US 2020/0408897 A1 Dec. 31, 2020

(30) Foreign Application Priority Data

Jun. 27, 2019 (EP) .................................... 19182964

(51) Int. Cl.
*G01S 13/89* (2006.01)
*G01C 7/04* (2006.01)
*G01S 13/08* (2006.01)

(52) U.S. Cl.
CPC ................. *G01S 13/89* (2013.01); *G01C 7/04* (2013.01); *G01S 13/08* (2013.01)

(58) Field of Classification Search
CPC ........ G01S 13/931; G01S 13/60; G01S 13/42; G01S 13/89; G01S 13/08; G01S 2013/93271; G01S 17/89; G01S 17/931; G01S 2015/939; G01C 7/04
USPC .................................................... 342/118, 70
See application file for complete search history.

(56) References Cited

U.S. PATENT DOCUMENTS

| | | | |
|---|---|---|---|
| 6,703,966 B2 * | 3/2004 | Corbrion ................. | G01S 13/60 342/194 |
| 6,795,014 B2 * | 9/2004 | Cheong ................. | G01S 7/4026 342/123 |
| 7,126,461 B2 * | 10/2006 | Takeichi ................. | G01S 15/46 340/436 |

(Continued)

FOREIGN PATENT DOCUMENTS

| | | |
|---|---|---|
| DE | 102014221034 A1 | 4/2016 |
| DE | 102016106299 A1 | 10/2016 |

(Continued)

OTHER PUBLICATIONS

Wheel Extraction based on Micro Doppler Distribution using High-Resolution Radar by Dominik Kellner published IEEE (Year: 2015).*

(Continued)

*Primary Examiner* — Donald H B Braswell
*Assistant Examiner* — Michael W Justice
(74) *Attorney, Agent, or Firm* — Carlson, Gaskey & Olds, P.C.

(57) ABSTRACT

An illustrative example embodiment of a computer implemented method for estimating a vertical profile of a road in front of or behind a host vehicle includes monitoring a detection point at a surrounding or preceding vehicle by a sensor on the host vehicle, determining at least one value for a height of the detection point with respect to a reference level at the host vehicle based on the elevation angle of the detection point, and estimating the vertical profile of the road based on the at least one value for the height of the detection point. An estimation of a height of the object with respect to a road surface may be corrected by the estimated vertical profile.

15 Claims, 3 Drawing Sheets

(56) References Cited

U.S. PATENT DOCUMENTS

Figure 1:
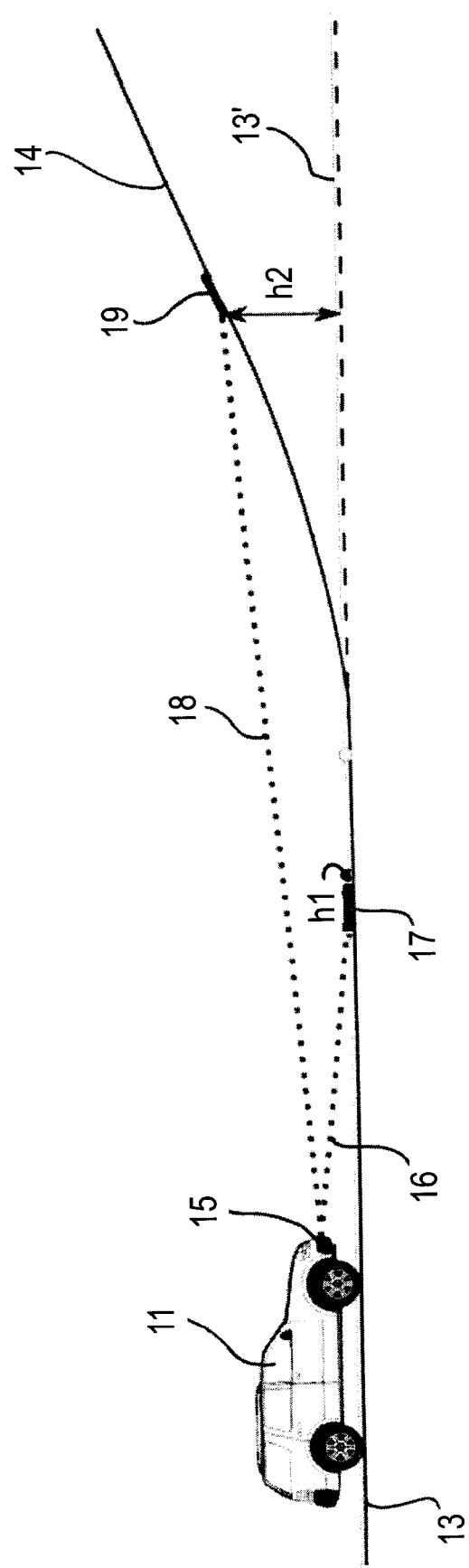

| | | | | |
|---|---|---|---|---|
| 8,135,513 B2* | 3/2012 | Bauer | ............... | G01S 7/4972 |
| | | | | 701/523 |
| 9,598,086 B2* | 3/2017 | Heim | ............... | B60W 30/16 |
| 9,689,983 B2* | 6/2017 | Cao | ............... | G01S 13/42 |
| 10,782,129 B2* | 9/2020 | Maucher | ............... | G01B 21/20 |
| 10,836,388 B2* | 11/2020 | Takaki | ............... | G01S 13/867 |
| 2003/0052814 A1* | 3/2003 | Corbrion | ............... | G01S 13/60 |
| | | | | 342/115 |
| 2004/0080450 A1* | 4/2004 | Cheong | ............... | G01S 13/867 |
| | | | | 342/55 |
| 2005/0110620 A1* | 5/2005 | Takeichi | ............... | G01S 15/931 |
| | | | | 701/45 |
| 2009/0103781 A1* | 4/2009 | Fleury | ............... | G06T 7/73 |
| | | | | 382/104 |
| 2009/0312906 A1* | 12/2009 | Bauer | ............... | B60W 40/06 |
| | | | | 701/36 |
| 2014/0218227 A1* | 8/2014 | Stelzen | ............... | G01S 13/04 |
| | | | | 356/27 |
| 2015/0120153 A1* | 4/2015 | Heim | ............... | G06V 20/58 |
| | | | | 382/103 |
| 2016/0284213 A1* | 9/2016 | Cao | ............... | G01S 13/584 |
| 2019/0001978 A1* | 1/2019 | Takaki | ............... | B60W 40/076 |
| 2019/0170511 A1* | 6/2019 | Maucher | ............... | G01S 17/931 |
| 2020/0150248 A1* | 5/2020 | Jung | ............... | G01S 7/4816 |

FOREIGN PATENT DOCUMENTS

| | | |
|---|---|---|
| EP | 1286181 A1 | 2/2003 |
| EP | 1760491 A2 | 3/2007 |
| WO | 2018/138584 A1 | 8/2018 |

OTHER PUBLICATIONS

Extended European Search Report for Application No. EP 19 18 2964 dated Dec. 17, 2019.

* cited by examiner

VERTICAL ROAD PROFILE ESTIMATION

CROSS REFERENCE TO RELATED APPLICATIONS

This application claims priority to European Patent Application No. 19182964.7, filed on Jun. 27, 2019.

FIELD

The present disclosure relates to a method and a system for estimating a vertical profile of a road in front of or behind a host vehicle.

BACKGROUND

Sensors like radar or lidar sensors mounted on a host vehicle are typically used for monitoring target objects within an environment of the host vehicle. For example, a radar sensor may determine a height of a target object in a coordinate system of a radar sensor by estimating an elevation angle between the radar sensor and the target object. If a mounting height and a dynamic pitch of the radar sensor are known or can be estimated, the height of the target object may also be determined in relation to the road surface on which the host vehicle is currently driving.

In order to ensure save driving of the host vehicle on a road, it is crucial to determine whether such a target object is an obstacle being located within the actual driving path or within a planned driving path of the host vehicle. If the target object is recognized as a possible obstacle, it needs to be decided whether the possible obstacle can be driven over or not based on the height of the target object which may be determined by the radar sensor. If the height of the target object exceeds a predetermined threshold, for example, an automated emergency braking of the host vehicle may be activated. In addition, for autonomous driving a path planning may be modified if it is decided that the target object cannot be driven over.

However, the estimation of the height of a target object is usually performed under the assumption that the road on which the host vehicle is moving is flat. That is, no change of the slope of a vertical profile of the road is taken into account. This assumption does obviously not hold when the host vehicle is moving within a hilly landscape. As a consequence, the height of a target object having some distance to the host vehicle may be strongly overestimated or underestimated by using the data provided by the radar sensor. In addition, systems which rely on a correct height estimation of target objects, like the automatic emergency braking, cannot be controlled properly if the height estimation of the target objects is not reliable.

In order to monitor the course of the road in vertical direction for correcting the height estimation, it has been proposed to use contact points or contact areas with a ground surface for fixed objects in the environment of the host vehicle. As such fixed objects delineators, poles or guard rails may be applied. However, the contact points or areas of such objects are often not located at the same level as the road surface. In addition, it may be very difficult to determine where the lowest point or area of such an object is positioned. This may even be complicated by multipath effects of the radar detection which may generate "ghost" measurements of the elevation angle, i.e. a detection of an object where actually no such object is located.

Accordingly, there is a need for a method and a system providing a reliable estimation of a vertical profile of a road in front of or behind a host vehicle and having low hardware requirements.

SUMMARY

In one aspect, the present disclosure is directed at a computer implemented method for estimating a vertical profile of a road in front of or behind a host vehicle, wherein the host vehicle comprises a sensor configured to detect an elevation angle and a velocity, relative to the host vehicle, of an object located in an environment of the host vehicle. The method comprises monitoring a detection point at a surrounding or preceding vehicle by the sensor, determining at least one value for a height of the detection point with respect to a reference level at the host vehicle based on the elevation angle of the detection point being detected by the sensor, and estimating the vertical profile of the road based on the at least one value for the height of the detection point.

For example, the sensor may be mounted at the front or rear of the host vehicle. In both cases, the vertical profile of the road which is to be estimated is located within the field of view of the sensor. In other words, the sensor is able to "see" a part of the road for which the vertical profile is estimated by the method. Generally, the relevant part of the road is not restricted to a short range, but may be a range up to e.g. several hundred meters with regard to the host vehicle.

The detection point may be defined as a small circular area on the surrounding or preceding vehicle. This small area may extend, for example, over one or a few square centimeters. The reference level may be defined as a plane in which the wheels of the host vehicle contact the road surface. Furthermore, the elevation angle may be defined with respect to a line passing through the mounting position of the sensor at the vehicle and being parallel to the plane in which the wheels of the host vehicle contact the road surface.

The sensor may be a radar sensor already existing on the host vehicle and being configured for the estimation of a height of a target object being located in the environment of the host vehicle in relation to the current location of the host vehicle. Therefore, no additional sensor is required for performing the method. Since the vertical profile of the road is estimated based on the at least one value for the height of the detection point, no predefined three-dimensional map for the environment of the host vehicle is needed.

Since the surrounding or preceding vehicle follows the vertical profile of the road automatically, a reliable estimation of the vertical profile of the road may be achieved based on the detection point being located at this vehicle. Uncertainties related to the determination of contacting points of fixed objects are therefore avoided. If the sensor may additionally be used for a height estimation of a target object, the sensor may correct itself with respect to the height estimation by using the vertical profile of the road being estimated by the method. Thus, a reliable estimation of the height of a target object with respect to the road surface may be facilitated.

The method may comprise one or more of the following features. A plurality of values for the height of the detection point may be determined with respect to the reference level at the host vehicle for a predetermined time period, and a road profile model may be adapted to the plurality of values for the height of the detection point. The road profile model may comprise a predetermined function including a set of parameters which are determined such that a deviation between the function and the plurality of values for the height of the detection point is minimized. The detection point may be defined within a region of a wheel of the surrounding or preceding vehicle, wherein the region may be located adjacent to a surface of the road. The detection point may further be defined at a contact area at which a wheel of the surrounding or preceding vehicle contacts a surface of the road. A position of the detection point may be estimated by determining a velocity distribution of a portion of the wheel of the surrounding or preceding vehicle with respect to the surface of the road by using the sensor and by determining the position of the detection point by selecting a position within the portion of the wheel at which the velocity distribution has a minimum value.

Furthermore, the method may also comprise one or more of the following features. A localization region of the surrounding or preceding vehicle may be determined by the sensor before monitoring the detection point. Alternatively or additionally, a localization region of a wheel of the surrounding or preceding vehicle may be determined by determining a micro Doppler distribution via the sensor before monitoring the detection point. In addition, a height of a target object may be determined with respect to a surface of the road based on the estimated vertical profile of the road by using the sensor.

According to an embodiment, a plurality of values for the height of the detection point is determined with respect to the reference level at the host vehicle for a predetermined time period. A road profile model may be adapted to the plurality of values for the height of the detection point. The road profile model may comprise a predetermined function including a set of parameters which are determined such that a deviation between the function and the plurality of values for the height of the detection point is minimized. The predetermined function may be, for example, a piecewise linear function, a quadratic function or a clothoid curve.

Since the vertical profile of the road may be estimated by using the road profile model and based on a plurality of values, the accuracy of the estimation of the vertical profile of the road may be improved. For the adapting of the road profile model standard curve fitting procedures may be applied being performed in a very short time period. This may provide a fast performance of the method.

In addition, determining the plurality of values for the predetermined time period may be a continuous process similar to the determination of a moving average. The adapting of the road profile model may therefore be updated every time a new value for the height of the detection point is determined. Due to this, the accuracy for estimating the vertical profile of the road may be further improved.

The detection point may be defined within a region of a wheel of the surrounding or preceding vehicle. This region may be located adjacent to a surface of the road. Furthermore, the detection point may be defined at a contact area at which a wheel of the surrounding or preceding vehicle contacts the surface of the road.

Due to the movement of the wheel of the surrounding or preceding vehicle, the region of the wheel and/or its contact area with the surface of the road may be distinguished from the rest of the surrounding or preceding vehicle and from other objects in the environment of the host vehicle. The contact area of the wheel has the special property when detected by the sensor of the host vehicle that it appears to have a velocity of approximately zero with respect to the road surface.

Therefore, since the sensor is additionally configured to detect a velocity of an object, a position of the detection point may be estimated by determining a velocity distribution of a portion of the wheel of the surrounding or preceding vehicle with respect to the surface of the road by using the sensor and by determining the of the detection point by selecting a position within the portion of the wheel at which the velocity distribution has a minimum value. The velocity distribution of the portion of the wheel may be determined by detecting a Doppler velocity derived from the signals of the sensor and by correcting the Doppler velocity for the velocity of the host vehicle. Since the Doppler velocity is a relative velocity between the host vehicle and the detection point at the surrounding or preceding vehicle if it is estimated based on the signal of the sensor, the correction for the velocity of the host vehicle is required in order to determine the velocity distribution of the portion of the wheel with respect to the road surface. The velocity of the host vehicle may be determined by a conventional speedometer.

In this way, the height of the detection point being in contact with the surface of the road may be followed relative to the host vehicle providing nodes for the estimation of the vertical profile of the road directly. In other words, the lowest position of the surrounding or preceding vehicle may be determined which provides a direct indication of the course of the vertical road profile.

A localization region of the surrounding or preceding vehicle may be determined by the sensor before monitoring the detection point. Additionally or alternatively, a localization region of a wheel of the surrounding or preceding vehicle may be determined by determining a micro Doppler distribution via the sensor before monitoring the detection point. Therefore, the surrounding or preceding vehicle or its wheel may be identified uniquely before the further steps of the method are performed. Due to this, an erroneous selection of a detecting point outside the surrounding or preceding vehicle may be avoided.

According to a further embodiment, a height of a target object may be estimated with respect to a surface of the road based on the estimated vertical profile of the road by using the sensor. The estimated vertical profile of the road may therefore be applied for an improved estimation of the height of the target object with respect to the road surface.

In another aspect, the present disclosure is directed at a system for estimating a vertical profile of a road in front of or behind a host vehicle. The system comprises a sensor on the host vehicle that is configured to monitor an elevation angle of a detection point at a surrounding or preceding vehicle, and an estimation module configured to determine at least one value for a height of the detection point with respect to a reference level at the host vehicle based on the elevation angle of the detection point being detected by the sensor. The estimation module estimates the vertical profile of the road based on the height of the a least one detection point.

The sensor may already exist at the host vehicle for other purposes, e.g. for monitoring target objects in the environment of the host vehicle. The estimation module may be no additional hardware module, but just comprise additional software being implemented within a controlling unit for the sensor in order to determine at least one value for the height of the detection point. Therefore, no additional hardware is required for implementing the system. Instead, signals of the existing sensor may be processed by additional software. In this case, the existing sensor corrects itself regarding the height estimation of a target object by taking the estimated vertical profile of the road into account.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor.

In addition, the sensor may be a radar sensor configured to send a radar signal toward a target object and to receive a reflection signal being reflected from the target object.

The system may comprise one or more of the following features. The sensor may be configured to determine a velocity distribution of a portion of a wheel of the surrounding or preceding vehicle with respect to a surface of the road, wherein the portion of the wheel is located at a contact area at which the wheel contacts the surface of the road. The estimation module may be configured to determine a position of the detection point by selecting a position within the portion of the wheel at which the velocity distribution has a minimum value. The estimation module may further be configured to estimate a height of a target object with respect to the surface of the road based on the estimated vertical profile of the road. Furthermore, the estimation module may comprise a localization unit being configured to determine a localization region of the surrounding or preceding vehicle by using the sensor and/or to determine a localization region of a wheel of the surrounding or preceding vehicle by determining a micro Doppler distribution via the sensor.

According to an embodiment, the sensor is additionally configured to determine a velocity distribution of a portion of a wheel of the surrounding or preceding vehicle with respect to a surface of the road. If the velocity distribution of the portion of the wheel is determined based on a Doppler velocity derived from the signals of the sensor, the Doppler velocity needs to be corrected for the velocity of the host vehicle in order to determine the velocity distribution of the portion of the wheel with respect to the road surface.

The portion of the wheel may be located at a contact area at which the wheel contacts the surface of the road. According to this embodiment, the estimation module is configured to determine a position of the detection point by selecting a position within the portion of the wheel at which the velocity distribution has a minimum value.

The minimum value of the velocity may be approximately zero if corrected for the motion of the host vehicle as mentioned above. As the detection point, a position at the surrounding or preceding vehicle may therefore be selected which has the same properties as a static object in the environment of the host vehicle, i.e. a velocity of zero. Such a detection point having almost zero velocity may be easily distinguished from the rest of the surrounding or preceding vehicle and from the environment of the host vehicle. Thus, the height of the vertical profile of the road may be reliably determined since the detection point located close to the contact area of the wheel follows the road profile automatically.

The estimation module may be further configured to estimate a height of a target object with respect to a surface of the road based on the estimated vertical profile of the road. The estimation of the height of the target object may be therefore corrected by the estimated vertical profile. Thus, the probability of an erroneous detection of an obstacle, e.g. in front of the vehicle, may be strongly reduced since a slope of the road can be distinguished from an obstacle e.g. within the lane on which the host vehicle is driving. In addition, the probability of an erroneous emergency braking due to an erroneous detection of an obstacle may also be reduced.

According to an embodiment, the estimation module comprises a localization unit which is configured to determine a localization region of the surrounding or preceding vehicle by using the sensor. In addition or alternatively, the localization module may be configured to determine a localization region of a wheel of the surrounding or preceding vehicle by determining a micro Doppler distribution via the sensor. By these means, the relevant area in which the position of the detection point is determined may be restricted. Therefore, a desired detection point being located e.g. close to the contact area of a wheel of the surrounding or preceding vehicle may be distinguished from other static objects in the environment of the host vehicle. Therefore, the reliability of the estimation of the vertical profile of the road may be improved.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
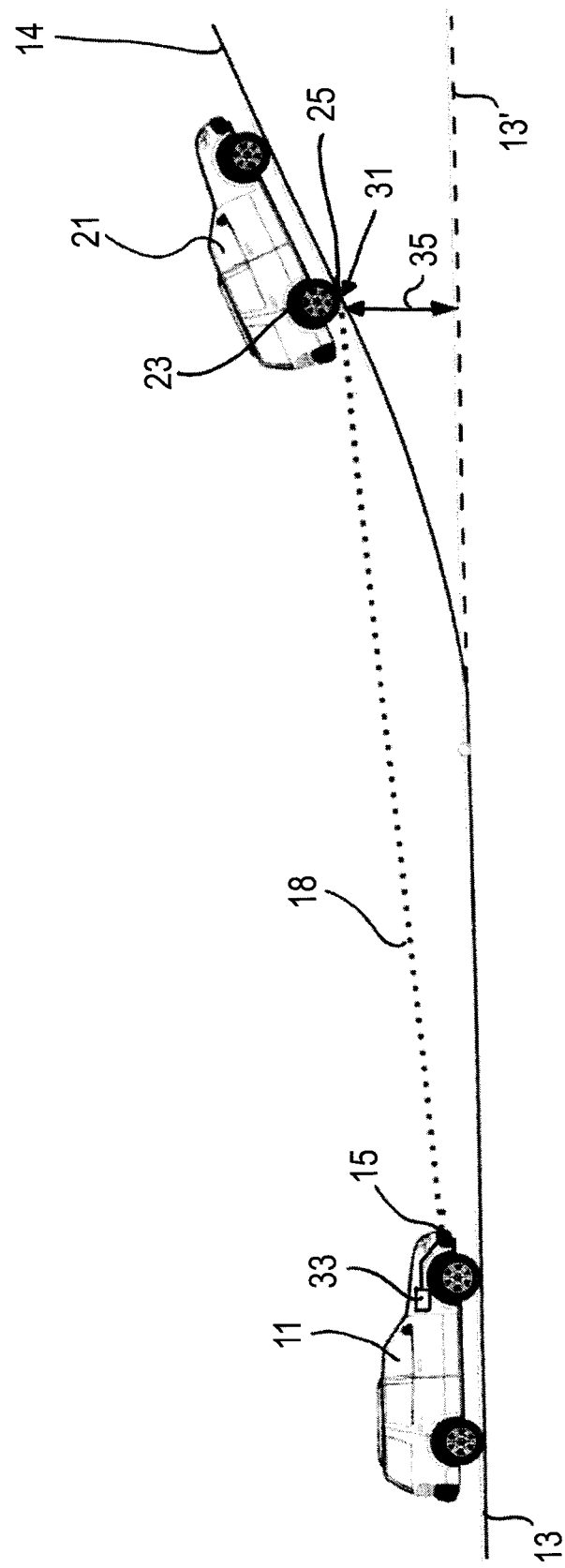
Figure 3:
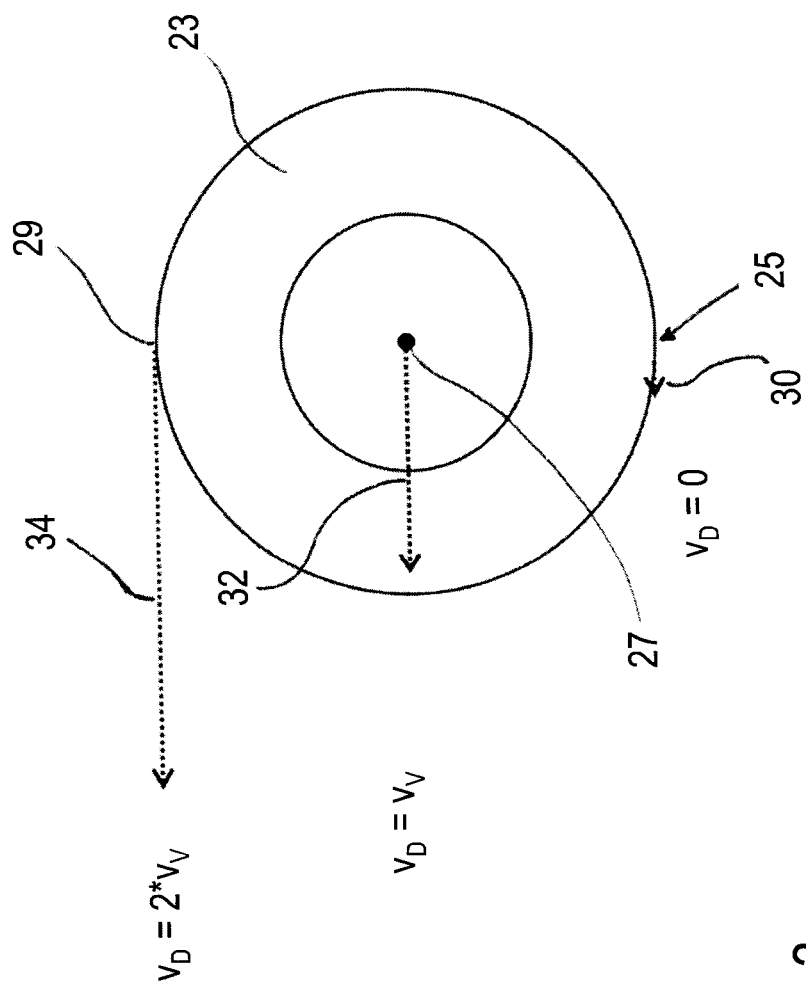

Exemplary embodiments and functions of the present disclosure are described herein in conjunction with the following drawings:

FIG. 1 schematically depicts a host vehicle comprising a radar sensor for detecting target objects in front of the vehicle, FIG. 2 schematically depicts the host vehicle from FIG. 1 and a preceding vehicle being used to determine a vertical profile of the road, and FIG. 3 schematically depicts a wheel of the preceding vehicle and a velocity distribution during driving.

DETAILED DESCRIPTION

FIG. 1 depicts a host vehicle 11 which is moving on a road 13. The host vehicle 11 comprises a radar sensor 15 which is arranged closed to a bumper of the host vehicle 11. The radar sensor 15 is provided for monitoring target objects in front of the host vehicle 11, e.g. a first target object 17 and a second target object 19 as shown in FIG. 1.

The radar sensor 15 is configured to send radar signals towards the target objects 17, 19 and to receive a reflection signal being reflected from the target objects 17, 19. In FIG. 1, the radar signals sent the respective target objects 17, 19 and being reflected therefrom are depicted by respective rays 16, 18. In a coordinate system of the radar sensor 15, the height of the target objects 17, 19 may be determined by estimating an elevation angle between a line passing through the radar sensor 15 in parallel to the road surface and the respective target object 17, 19. In addition, if the mounting height and the dynamic pitch of the radar sensor 15 are known, the respective height h1 and h2 of the target objects 17, 19 can be determined relative to the surface of the road 13 on which the host vehicle 11 is currently driving.

However, a vertical profile 14 of the road 13, i.e. a change of the slope of the road 13, is usually not taken into account when the heights h1, h2 of the respective target objects 17, 19 are determined. Although the target objects 17, 19 may have almost the same height h1 with respect to the road surface, the height h1 of the first target object 17 is determined correctly only, whereas the height h2 of the second target object 19 is determined with respect to a "flat" or horizontal extension 13' of the part of the road 13 on which the host vehicle 11 is currently driving. As a consequence, the height h2 of the second target object 19 with respect to the road surface is strongly overestimated for the current driving situation of the host vehicle 11.

Therefore, the first target object 17 is not detected as an obstacle for the host vehicle 11 since the height h1 is determined as being smaller than a predetermined height threshold. Thus, it can be assumed that the host vehicle 11 may overdrive the first target object 17 without damage. In contrast, the height h2 of the second target object 19 is determined as being greater than the height threshold. Thus, it is assumed that the second target object 19 is an obstacle for the host vehicle 11 which cannot be overdriven although the actual height of the second target object 19 with respect to the road surface is almost the same as the height h1 of the first target object 17 with respect to the road surface. Therefore, an erroneous automatic emergency braking may be triggered by the second target object 19 since the vertical profile 14 of the road 13 is not taken into account when the height h2 is determined.

In order to overcome this problem, a method and a system according to the present disclosure are provided which are illustrated with reference to FIGS. 2 and 3.

FIG. 2 depicts the host vehicle 11 following a preceding vehicle 21 which is driving on the same road 13 but within a different part of the vertical profile 14 of the road 13. The preceding vehicle 21 has a wheel 23 which contacts the surface of the road 13 at a contact area 25.

The wheel 23 of the preceding vehicle 21 is monitored by the radar sensor 15 of the host vehicle 11 which is indicated in FIG. 2 by the ray 18. Although the wheel 23 being monitored by the radar sensor 15 is depicted as one of the rear wheels of the vehicle, the radar sensor is configured to monitor any one of the wheels of the preceding vehicle 21. That is, one of the front wheels may also be monitored in order to perform the method according to the disclosure.

Via the radar sensor 15 of the host vehicle 11 the velocity of objects in the environment of the host vehicle 11 can be determined, i.e. by determining their Doppler velocity derived from the signals of the radar sensor 15 and by correcting the Doppler velocity for the motion of the host vehicle 11. If the velocity of the host vehicle is determined e.g. by a conventional speedometer, a velocity $v_D$ of an object with respect to the road surface may be determined by subtracting the velocity of the host vehicle from the Doppler velocity derived from the signals of the radar sensor 15. Thus, the velocity $v_D$ may also be referred to as velocity being compensated regarding the motion of the host vehicle or as ego-motion compensated Doppler velocity. If the velocity $v_D$ of the wheel 23 of the preceding vehicle 21 is detected, a special property of the contact area 25 of the wheel 23 can be exploited in order to estimate the vertical profile 14 of the road 13.

As shown in FIG. 3, the velocity $v_D$ of the contact area 25 of the wheel 23 with respect to the road surface is zero, as is known from basic wheel dynamics. In contrast, a center 27 of the wheel 23 is moving with a velocity $v_V$ of the preceding vehicle 21, and a top position 29 of the wheel 23 is moving with twice the vehicle velocity $v_V$, as is also known from basic wheel dynamics.

Since the detected velocity $v_D$ of the contact area 25 of the wheel 23 of the preceding vehicle 21 is approximately zero when the motion of the host vehicle 11 is compensated, the contact area 25 appears as a static object when monitored by the radar sensor 15 of the host vehicle 11. That is, the contact area 25 may be used as a detection point 31 for determining the vertical profile 14 by the method according to the disclosure.

Before the contact area 25 is applied for estimating the vertical profile 14 of the road 13, a bounding box of the preceding vehicle 21, i.e. a two-dimensional location of the preceding vehicle 21 and its extension when viewed from the host vehicle, may be determined by a radar vehicle tracker. Alternatively or additionally, a micro Doppler distribution may be determined via the radar sensor 15 of the host vehicle 11 in order to determine the region of the wheel 23 of the preceding vehicle 21 when viewed from the host vehicle 11. By this means, the region in which the preceding vehicle 21 and especially its wheel 23 are located may be distinguished from the position of further static objects being located within the environment of the host vehicle 11.

As a next step of the method, the position of the detection point 31, i.e. the position of the contact area 25 of the wheel 23 of the preceding vehicle 21, is determined by the radar sensor 15 by determining the position where the velocity $v_D$ being detected within the region of the wheel 23 of the preceding vehicle 21 is approximately zero.

By determining the elevation angle of the ray 18 monitoring the detection point 31, a height 35 of the detection point 31 may be determined with respect to the horizontal extension 13' of the road 13 on which the host vehicle 11 is currently moving.

The detection point 31 is monitored for a predetermined time period by the radar sensor 15 of the host vehicle 11 in order to determine a plurality of values for the height 35 of the detection point 31 with respect to a reference level at the host vehicle 11. As the reference level at the host vehicle 11, the surface of the road 13 at the current position of the host vehicle 11 may be used.

In order to estimate the vertical profile 14 of the road 13, a road profile model is adapted to the plurality of values for the height 35 of the detection point 31. The road profile model may comprise one or more predetermined functions, e.g. a piecewise linear function, a quadratic function and/or a clothoid curve, including parameters for adapting the road profile model to the plurality of values for the height 35 of the detection point 31. In addition to the radar sensor 15, the system for estimating the vertical profile of the road comprises an estimation module 33 which may perform a curve fitting technique for adapting the road profile model to the plurality of values for the height 35 of the detection point 31. Although the estimation module 33 is shown as a separate unit in FIG. 2, the estimation module 33 may be simply a part of an existing controlling unit (not shown) for the radar sensor 15 being already implemented in the host vehicle 11. For example, the estimation module 33 may comprise software instructions being performed by an existing processor within the controlling unit for the radar sensor 15.

The result of the method and the output of the system according to the disclosure is therefore an estimation of the vertical profile 14 of the road 13 in front of the host vehicle 11. The estimated vertical profile 14 may be used in order to correct the height of target objects being monitored by the radar sensor 15, e.g. the heights h1, h2 of the first and target objects 17, 19 shown in FIG. 1, relative to the actual course of the surface of the road 13. Especially, the overestimated height h2 of the second target object 19 is corrected to be almost the same as the height h1 of the first target object 17 relative to the vertical profile 14 of the road 13.

Furthermore, the plurality of values for the height 35 of the detection point 31 with respect to the reference level at the host vehicle 11 may be permanently updated. In detail, the predetermined time period for monitoring the height 35 of the detection point 31 may correspond to a certain number of values for the height 35 which are used for adapting the road profile model. During the movement of the host vehicle 11, the earliest value of the height 35 within the plurality of values is omitted when a new value for the height 35 is determined. Therefore, the estimation of the vertical profile 14 of the road 13 may be performed as a permanent process during the movement of the host vehicle 11.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of estimating a height of an object located in a vicinity of a vehicle, wherein the vehicle comprises a sensor configured to detect an elevation angle relative to the vehicle, the method comprising:
   using the sensor for monitoring a detection point of a second vehicle, which is distinct from the object, including determining a plurality of positions of the detection point and a corresponding plurality of elevation angles with respect to a reference level at the vehicle, wherein the detection point is defined within a region of a wheel of the second vehicle and the region is located adjacent to a surface of the road;
   estimating a vertical profile of a portion of a road based on the plurality of positions and the plurality of elevation angles;
   detecting the object by the sensor;
   determining a height of the object based on determining an elevation angle between the object and the reference level; and
   adjusting the determined height of the object based on the estimated vertical profile of the portion of the road.

2. The method according to claim 1, comprising determining a plurality of values for a height of the detection point with respect to the reference level during a predetermined time period, and wherein estimating the vertical profile of the portion of the road comprises adapting a road profile model to the plurality of values for the height of the detection point.

3. The method according to claim 2, wherein the road profile model comprises a predetermined function including a set of parameters which are determined such that a deviation between the function and the plurality of values for the height of the detection point is minimized.

4. The method according to claim 1, wherein the detection point is defined at a contact area at which the wheel contacts the surface of the road.

5. The method according to claim 4, wherein determining the plurality of positions of the detection point is based on
   using the sensor for determining a velocity distribution of a portion of the wheel with respect to the surface of the road, and
   selecting a location within the portion of the wheel at which the velocity distribution has a minimum value.

6. The method according to claim 1, comprising determining a localization region of the second vehicle by the sensor before monitoring the detection point.

7. The method according to claim 6, wherein determining the localization region includes determining a micro Doppler distribution via the sensor before monitoring the detection point.

8. A system for estimating a height of an object located in a vicinity of a vehicle, the system comprising:
   a sensor configured to detect the object and an elevation angle relative to the vehicle; and
   a controller that is configured to
      use information from the sensor for monitoring a detection point of a second vehicle, which is distinct from the object, including determining a plurality of positions of the detection point and a corresponding plurality of elevation angles with respect to a reference level at the vehicle, wherein the detection point is defined within a region of a wheel of the second vehicle and the region is located adjacent to a surface of the road;
      estimate a vertical profile of a portion of a road based on the plurality of positions and the plurality of elevation angles;
      determine a height of the object based on an elevation angle between the object and the reference level; and
      adjust the determined height of the object based on the estimated vertical profile of the portion of the road.

9. The system according to claim 8, wherein the controller is configured to
   determine a plurality of values for a height of the detection point with respect to the reference level during a predetermined time period, and
   estimate the vertical profile of the portion of the road by adapting a road profile model to the plurality of values for the height of the detection point.

10. The system according to claim 9, wherein the road profile model comprises a predetermined function including a set of parameters which are determined such that a deviation between the function and the plurality of values for the height of the detection point is minimized.

11. The system according to claim 8, wherein the detection point is defined at a contact area at which the wheel contacts the surface of the road.

12. The system according to claim 11, wherein the controller determines the plurality of positions of the detection point based on
   determining a velocity distribution of a portion of the wheel with respect to the surface of the road, and selecting a location within the portion of the wheel at which the velocity distribution has a minimum value.

13. The system according to claim 8, wherein the controller is configured to determine a localization region of the second vehicle before monitoring the detection point.

14. The system according to claim 13, wherein the controller is configured to determine the localization region by determining a micro Doppler distribution via the sensor before monitoring the detection point.

15. A non-transitory storage medium containing instructions that, when executed by a controller, cause the controller to:
  use information from a sensor supported on a vehicle for monitoring a detection point of a second vehicle, wherein the sensor is configured to detect an object, which is distinct from the second vehicle, in a vicinity of the vehicle and an elevation angle, and wherein the monitoring includes determining a plurality of positions of the detection point and a corresponding plurality of elevation angles with respect to a reference level at the vehicle, wherein the detection point is defined within a region of a wheel of the second vehicle and the region is located adjacent to a surface of the road;
  estimate a vertical profile of a portion of a road based on the plurality of positions and the plurality of elevation angles;
  determine a height of the object based on an elevation angle between the object and the reference level; and
  adjust the determined height of the object based on the estimated vertical profile of the portion of the road.

* * * * *